(12) United States Patent
Verhaeghe et al.

(10) Patent No.: US 11,180,245 B2
(45) Date of Patent: Nov. 23, 2021

(54) ENHANCED AUTOBRAKE SELECTION INTERFACE

(71) Applicant: The Boeing Company, Chicago, IL (US)

(72) Inventors: Anna K. Verhaeghe, Bozeman, MT (US); David T. Yamamoto, Mill Creek, WA (US)

(73) Assignee: The Boeing Company, Chicago, IL (US)

( * ) Notice: Subject to any disclaimer, the term of this patent is extended or adjusted under 35 U.S.C. 154(b) by 343 days.

(21) Appl. No.: 16/388,806

(22) Filed: Apr. 18, 2019

(65) Prior Publication Data

US 2020/0331596 A1 Oct. 22, 2020

(51) Int. Cl.
| | | |
|---|---|---|
| *B64C 25/42* | (2006.01) | |
| *B60T 17/22* | (2006.01) | |
| *B64D 43/02* | (2006.01) | |
| *B64D 45/00* | (2006.01) | |

(52) U.S. Cl.
CPC .......... *B64C 25/426* (2013.01); *B60T 17/221* (2013.01); *B64D 43/02* (2013.01); *B64D 45/00* (2013.01); *B64D 2045/0085* (2013.01)

(58) Field of Classification Search
CPC ..... B64C 25/426; B60T 17/221; B64D 43/02; B64D 45/00; B64D 2045/0085
See application file for complete search history.

(56) References Cited

U.S. PATENT DOCUMENTS

| | | | |
|---|---|---|---|
| 5,968,106 A | 10/1999 | DeVlieg et al. | |
| 9,738,378 B1 * | 8/2017 | Nikolic | ................. B64C 25/426 |
| 2008/0249675 A1 * | 10/2008 | Goodman | ............. B64C 25/426 |
| | | | 701/16 |
| 2015/0286215 A1 * | 10/2015 | Alvarado, Jr. | ........ B64C 25/426 |
| | | | 701/3 |
| 2018/0165975 A1 | 6/2018 | Schwartz et al. | |

FOREIGN PATENT DOCUMENTS

| | | |
|---|---|---|
| EP | 0895929 B1 | 2/1999 |
| EP | 3088266 A1 | 11/2016 |
| GB | 2411934 A | 9/2005 |
| WO | 2008121530 A2 | 10/2008 |

OTHER PUBLICATIONS

European Patent Office Extended Search Report, dated Sep. 15, 2020, regarding Application No. EP20158837.3, 8 pages.

* cited by examiner

*Primary Examiner* — Rachid Bendidi
(74) *Attorney, Agent, or Firm* — Yee & Associates, P.C.

(57) ABSTRACT

An autobrake selection interface for an aircraft includes a cockpit mounted user selectable display. The display includes autobrake selection options and braking information. The autobrake selection options include at least one of an autobrake off option, a rejected takeoff (RTO) option, a constant deceleration option, and a runway exit selection option. The braking information includes at least one of an estimated brake temperature, an estimated brake cooling time, and an estimated landing distance. The autobrake selection interface also includes a braking parameters determiner configured to determine at least one of the estimated brake temperature and the estimated landing distance according to user selection of the autobrake selection options.

20 Claims, 10 Drawing Sheets

ENHANCED AUTOBRAKE SELECTION INTERFACE

BACKGROUND INFORMATION

1. Field

The present disclosure relates generally to aircraft braking systems and, more specifically, to automated aircraft braking systems, methods, and interfaces for activating the automated aircraft braking system.

2. Background

Many commercial aircrafts come equipped with a feature called autobrake. Autobrake is a type of automatic wheel-based brake system normally enabled during takeoff and landing procedures. When landing, autobrake can aid in freeing up the pilot to allow monitoring of other systems. There are usually several settings for the rate of deceleration. The selection of these settings are normally done on the aircraft instrument panel before landing. The selection mechanism is typically a manual dial located in the cockpit.

A manual dial has many disadvantages, such as taking up space in the cockpit. Furthermore, the pilot must dedicate time to assess for runway and airplane conditions in order to determine the appropriate autobrake setting.

SUMMARY

In one illustrative embodiment, an autobrake selection interface for an aircraft is provided. The autobrake selection interface includes a cockpit mounted user selectable display. The display includes autobrake selection options and braking information. The autobrake selection options include at least one of an autobrake off option, a rejected takeoff (RTO) option, a constant deceleration option, and a runway exit selection option. The braking information includes at least one of an estimated brake temperature, an estimated brake cooling time, and an estimated landing rollout distance. The autobrake selection interface also includes a braking parameters determiner configured to determine at least one of the estimated brake temperature and the estimated landing distance according to user selection of the autobrake selection options.

In another illustrative embodiment, a method for autobrake selection in an aircraft is provided. The method includes displaying an autobrake selection interface comprising a constant deceleration option and a runway exit option. The method also includes displaying one of a constant deceleration selection menu and a runway exit menu response to user input in the autobrake selection interface. The method also includes setting a brake parameter according to user selection of one of a constant deceleration setting and a runway exit number.

In yet another illustrative embodiment, a computer for autobrake selection in an aircraft is provided. The computer includes a processor and a non-transitory computer readable storage medium storing program code which, when executed by the processor, performs a computer-implemented method of autobrake selection in an aircraft. The program code includes program code for displaying an autobrake selection interface comprising a constant deceleration option and a runway exit option. The program code also includes program code for displaying one of a constant deceleration selection menu and a runway exit menu response to user input in the autobrake selection interface. The program code also includes program code for setting a brake parameter according to user selection of one of a constant deceleration setting and a runway exit number.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

The different illustrative embodiments recognize and take into account one or more different considerations. For example, the illustrative embodiments recognize and take into account that current autobrake systems take up significant space in the cockpit and require a considerable amount of wiring. The illustrative embodiments recognize and take into account that current autobrake systems require the pilot to make a number of calculations in determining which settings to select on the autobrake. The illustrative embodiments recognize and take into account that making these calculations adds to the pilot's workload, possibly during landing.

Embodiments of the disclosed enhanced autobrake system provide an autobrake interface on the display thereby removing mechanical and wiring features from the cockpit. Furthermore, embodiments of the disclosed enhanced autobrake system automatically calculate brake settings necessary to bring an aircraft to an appropriate speed to exit a runway at a runway exit selected by the pilot. The selection of an autobrake option using the disclosed autobrake interface and display can be done prior to or during flight. Illustrative embodiments of the present disclosure automates the autobrake calculations, thereby reducing crew workload.

Figure 1:
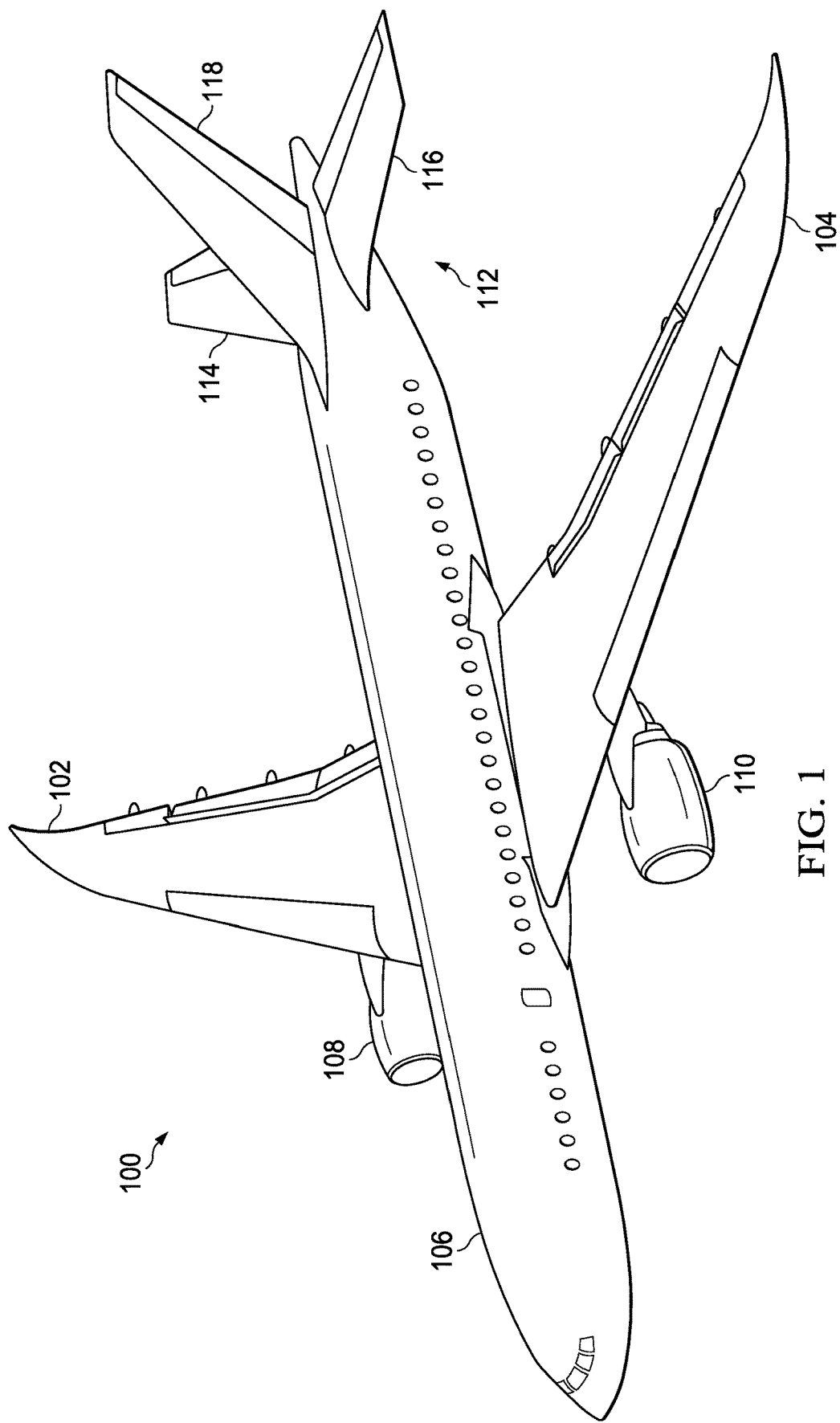
FIG. 1 is an illustration of an aircraft in which an illustrative embodiment may be implemented.

Referring now to the figures and, in particular, with reference to FIG. 1, an illustration of an aircraft is depicted in which an illustrative embodiment may be implemented. In this illustrative example, aircraft 100 has wing 102 and wing 104 connected to body 106. Aircraft 100 includes engine 108 connected to wing 102 and engine 110 connected to wing 104.

Body 106 has tail section 112. Horizontal stabilizer 114, horizontal stabilizer 116, and vertical stabilizer 118 are connected to tail section 112 of body 106. Aircraft 100 is an example of an aircraft in which the disclosed enhanced autobrake system may be implemented.

As used herein, the phrase "at least one of," when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category.

For example, "at least one of item A, item B, or item C" may include, without limitation, item A, item A and item B, or item B. This example also may include item A, item B, and item C or item B and item C. Of course, any combination of these items may be present. In other examples, "at least one of" may be, for example, without limitation, two of item A; one of item B; and ten of item C; four of item B and seven of item C; or other suitable combinations.

This illustration of aircraft 100 is provided for purposes of illustrating one environment in which the different illustrative embodiments may be implemented. The illustration of aircraft 100 in FIG. 1 is not meant to imply architectural limitations as to the manner in which different illustrative embodiments may be implemented. For example, aircraft 100 is shown as a commercial passenger aircraft. The different illustrative embodiments may be applied to other types of aircraft, such as a private passenger aircraft, a rotorcraft, or other suitable types of aircraft.

Figure 2:
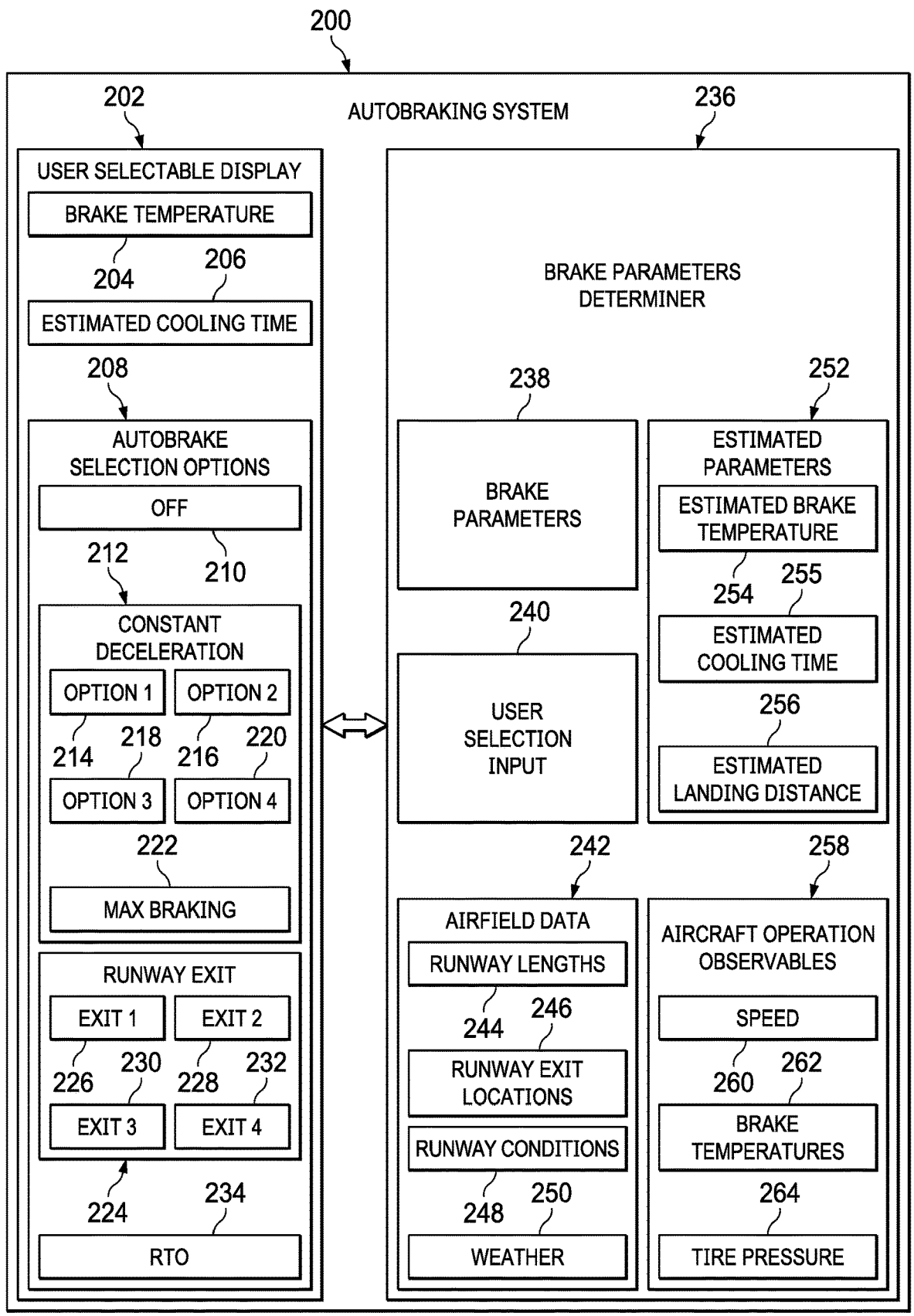
FIG. 2 is an illustration of an autobrake system in accordance with an illustrative embodiment.

Turning now to FIG. 2, a block diagram of autobrake system 200 is depicted in accordance with an illustrative embodiment. Autobrake system 200 includes user selectable display 202 and brake parameters determiner 236. User selectable display 202 is configured to present autobrake selection options and braking information to the pilot. User selectable display 202 includes brake temperature 204 display that displays the current temperature of the brakes and/or the estimated temperature of the brakes after applying a user selection of braking options. User selectable display 202 also includes estimated cooling time 206 display that shows the pilot the estimated cooling time of the brakes if the current braking option selections are used.

User selectable display 202 also includes autobrake selection options 208. Autobrake selection options 208 provide the pilot with a plurality of options for autobraking. The options include off 210, constant deceleration 212, runway exit 224, and RTO 234.

Constant deceleration 212, when selected, provides the pilot with a plurality of constant deceleration brake settings depending on how quickly the pilot wishes to slow down the airplane. The options include option 1 214, option 2 216, option 3 218, option 4 220, and max braking 222. In other embodiments, more or fewer brake options are presented to the pilot. Each constant deceleration option 214, 216, 218, 220, 222 corresponds to a different level of braking. In an alternate embodiment, the selection options are presented to the pilot in a slider on the screen to provide an almost unlimited number of deceleration settings (i.e., a continuous set of values for the deceleration setting). In other embodiments, fewer brake options are provided to the pilot.

Runway exit 224, when selected provides a plurality of exits including exit 1 226, exit 2 228, exit 3 230, and exit 4 232. Each exit corresponds to a different runway exit at the selected airport. The number of options corresponds to the number or runway exits for a particular runway at a particular airport. Once an option is selected, the brake parameters are determined and set to ensure that the aircraft is slowed sufficiently for the aircraft to exit at the selected runway exit. Runway exit options 226, 228, 230, 232 that are unavailable due to the aircraft being, for example, too far down the runway, going too fast, etc. are shown to the pilot, but are not selectable. In an embodiment, the color, brightness, or other feature, or indicia of the unavailable ones of exit options 226, 228, 230, 232 are modified to be different from the same feature of the selectable ones of exit options 226, 228, 230, 232. Providing the pilot with an option to select the desired exit frees the pilot from making braking calculations and therefore is free to direct attention to other of a multitude of factors requiring the pilot's attention during landing.

Brake parameters determiner 236 controls the features displayed on user selectable display 202 and responds to pilot selection to modify user selectable display 202. Brake parameters determiner 236 also determines brake parameters 238 that correspond to the pilot's input. Brake parameters determiner 236 determines brake parameter settings according to user selection input 240 received from user selectable display 202 and according to other factors. The other factors may include one or more of airfield data 242 and aircraft operation observables 258. Airfield data 242 includes runway lengths 244, runway exit locations 246, runway conditions 248 (e.g., wet, dry, icy, etc.), and local weather 250, such as, for example, wind which can change approach speed of the aircraft. The airfield data may also include other data such as, for example, altitude of the airfield. Aircraft operation observables 258 include aircraft speed 260, brake temperatures 262, and tire pressure 264. Aircraft operation observables 258 may include other information, such as, for example, aircraft altitude and brake failure that can be taken into account for stopping performance. Brake parameters determiner 236 also determines estimated parameters 252 based on the pilot selections, airfield data 242, aircraft operation observables 258, and/or other information. Estimated parameters 252 include estimated brake temperature 254, estimated cooling time 255 for the brakes, and estimated landing distance 256 for the pilot brake selections.

Figure 3:
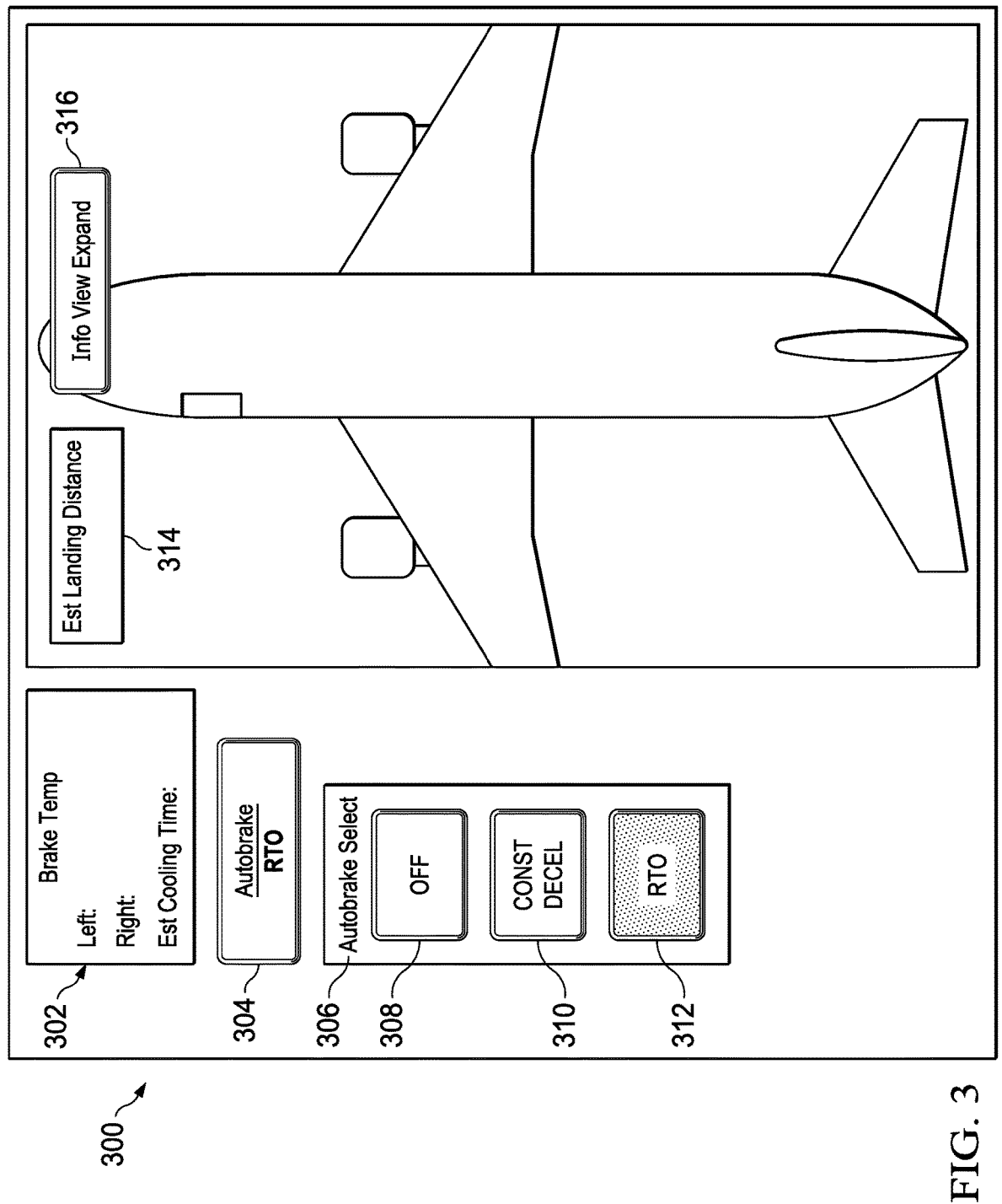
FIG. 3 is an illustration of an enhanced autobrake interface in accordance with an illustrative embodiment.

Turning now to FIG. 3, an illustration of an enhanced autobrake interface is depicted in accordance with an illustrative embodiment. In an embodiment, enhanced autobrake interface 300 is a touchscreen that both displays information and receives user input through touching various locations on the screen. In other embodiments, enhanced autobrake interface 300 may be other types of displays that utilize different input methods, such as a pointer and a mouse, to allow the pilot to select various options. Interface 300 includes brake temperature display 302, selected autobrake indicator 304, autobrake selection interface 306, estimated landing distance display 314, and informational view display 316 that is expandable and collapsible. Selected autobrake indicator 304 shows the pilot the selection that the pilot has made. In the depicted example, the pilot has selected the rejected takeoff (RTO) option. The options provided to the pilot in this example in autobrake selection interface 308 include off 308, specific constant deceleration 310, and RTO 312. The particular selected option of RTO 312 is also displayed in a manner that is different from the other non-selected options off 308, and specific constant deceleration 310.

In an embodiment, enhanced autobrake interface 300 is continuously displayed on, for example, the brake/doors menu presented to the pilot. Enhanced autobrake interface 300 allows the pilot to select a system function: off 308, specific constant deceleration 310 (legacy autobrake settings), rejected takeoff (RTO) 312, or brake to exit (BTE) function. During first taxi and takeoff, RTO 312 setting is available and the runway exit is not available or displayed. The runway exit is available during descent and RTO 312 is not available as described below and shown in FIG. 6. The selected function of RTO 312 will appear as, for example, green. The default selected setting for takeoff will be RTO 312 with the ability to select off 308 (or specific constant deceleration 310 under certain circumstances mainly for test purposes). Upon takeoff, the autobrake function switches to off 308 automatically. The default setting for descent will be off 308. If airfield data 242 is not available for runway exits 224, runway exit 224 will not be selectable.

Figure 5:
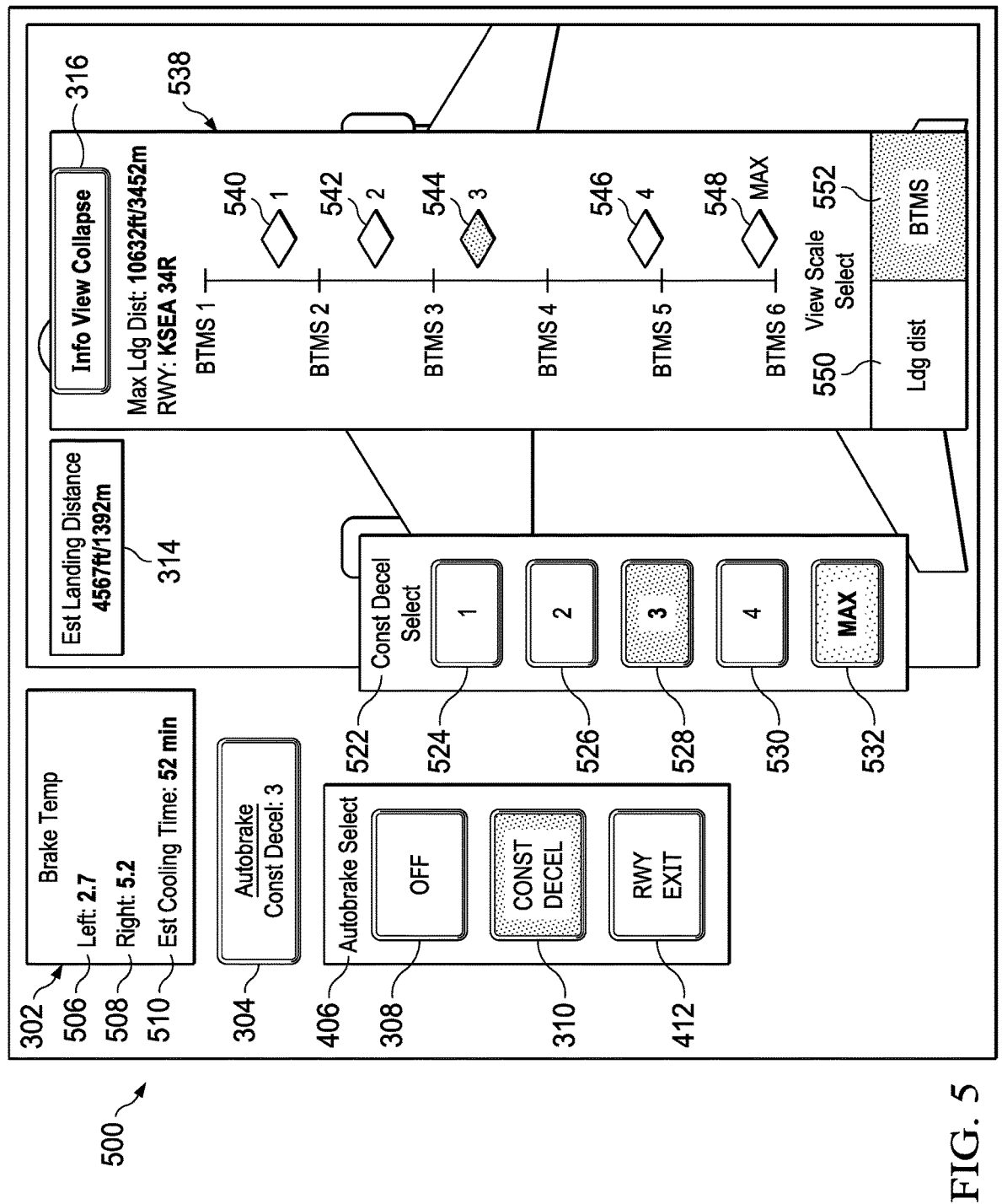
FIG. 5 is an illustration of an enhanced autobrake interface in constant deceleration mode in accordance with an illustrative embodiment.
Figure 6:
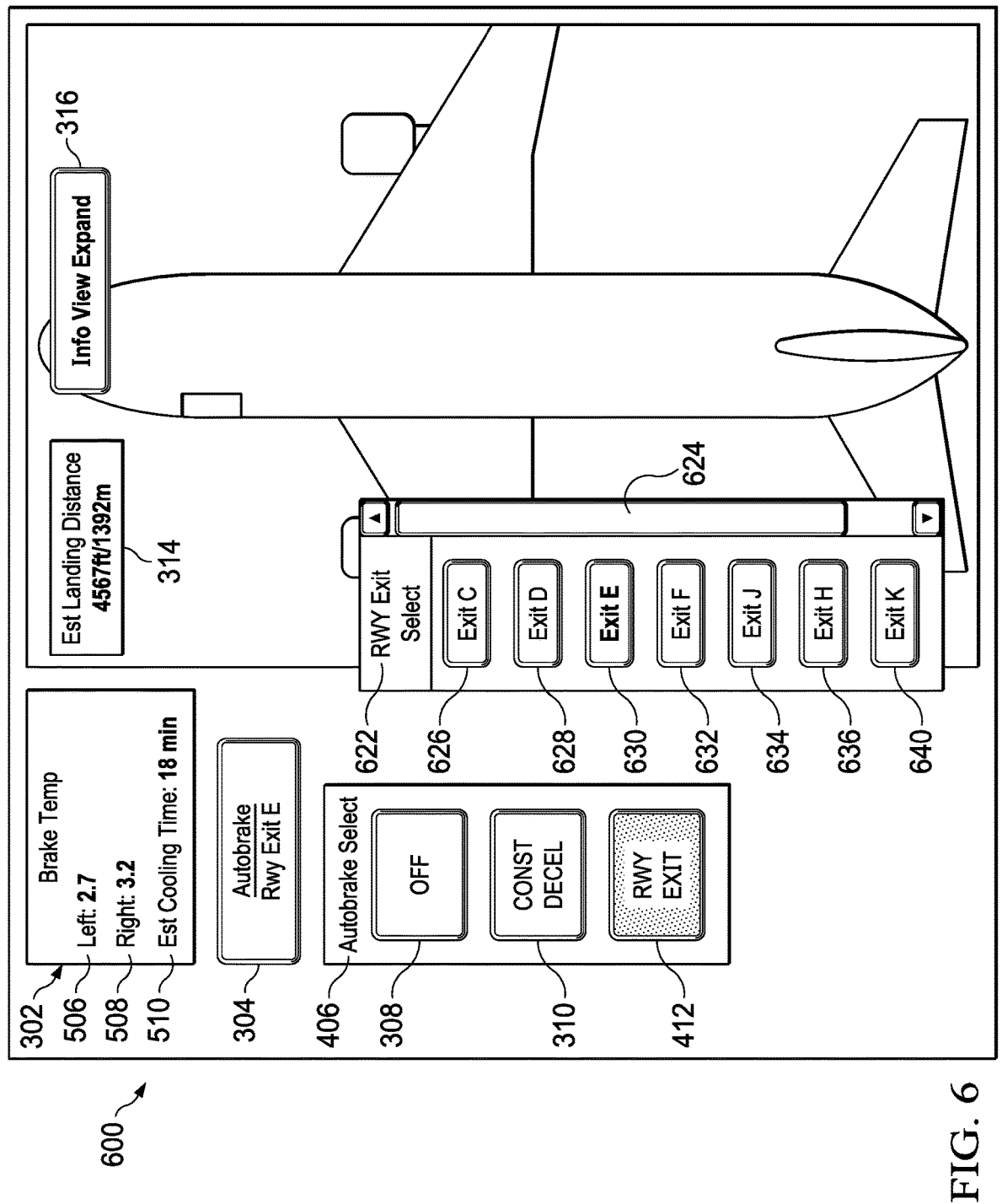
FIG. 6 is an illustration of an enhanced autobrake interface in runway exit selection mode in accordance with an illustrative embodiment.

Upon selecting either specific constant deceleration or runway exit, the respective selection menu will appear. The enhanced autobrake interface for constant deceleration is shown in FIG. 5 and described in more detail below. The enhanced autobrake interface for a runway exit is shown in FIG. 6 and also described in more detail below. Exits/settings available for selection will appear, for example, with white lettering. Exits/settings available, but not recommended (high brake temperature monitoring system (BTMS), etc.) will have, for example, amber lettering. Exits/settings that are unavailable for selections (e.g., deceleration above AB4) will appear, for example, in gray lettering. The selected exit will appear, in for example, green. In an embodiment, for runway exit, if there are more than 5 exits on the runway listed, a scroll bar will appear to the right.

Brake temperature display 302 shows the predicted brake temperature of the selected setting for the landing gear as well as the estimated cooling time for the brake system. The cooling time is the time from which the aircraft may subsequently dispatch safely. If any BTMS is above 5, it is displayed in amber. These BTMS scores update in real-time.

Estimated landing distance display 314 displays the estimated landing distance of the selected setting based on deceleration, runway conditions, given inputs, etc. Landing distance is distance to decelerate to 0, or other values, from, for example, nominal touchdown point of the runway or distance to exit. Landing distance will be updated in real-time. By updating landing distance in real-time, the actual touchdown point on the runway may be accounted for and factored into the various calculations such as available runway exits, etc. The stopping point is represented by, in an embodiment, a "football" icon or other indicator on the Nav display and the HUD that will also be updated in real-time.

Information view display 316 default will be "collapsed" mode. If all the necessary inputs are given, the information display lettering will be green. Otherwise, it will be gray. When informational view is expanded, the runway and maximum landing distance are displayed at the top. (These are shown in FIGS. 5 and 6). The view scale select at the bottom allows the pilot to view the setting either on a brake temperature monitoring system (BTMS) scale, or a landing position scale. If the constant deceleration function is selected on autobrake select menu 306, the legacy autobrake settings are shown on a graphically representative scale. If runway exit is selected, the runway exits are displayed. The selected exit diamond is green. In an embodiment, the settings are accurately graphically scaled. Relative to either landing distance or BTMS. This is not a selection menu, but provides important information that allows the pilot to make an informed decision and to verify their selection. The scale itself is autoscaled. In an embodiment, for landing distance, it is autoscaled by the 1,000 feet from the nearest 1,000 feet above the longest setting to the nearest 1,000 feet below the shortest setting. Similarly, in an embodiment, BTMS is scaled by the full range of 0.0-9.9 BTMS.

Figure 4:
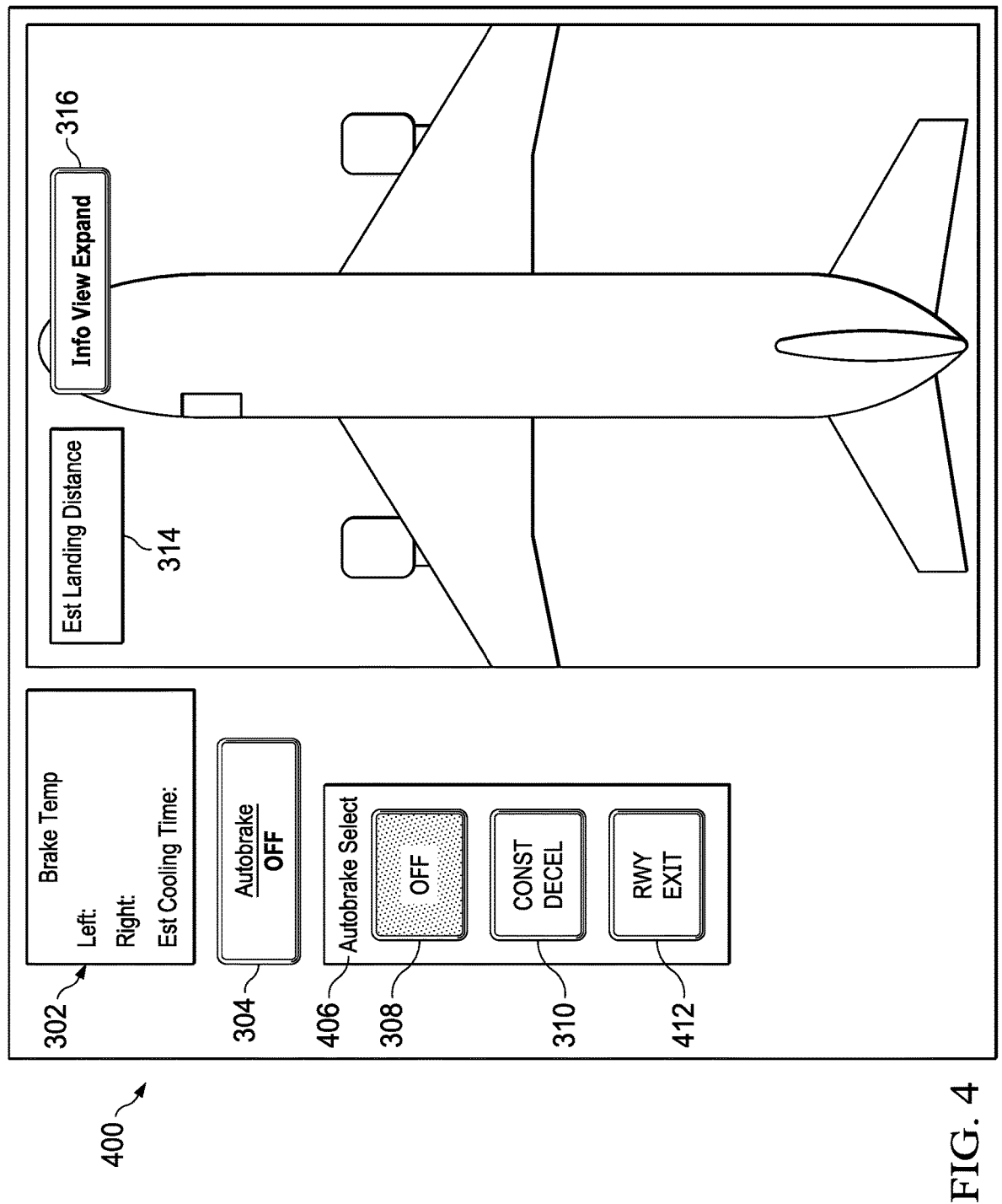
FIG. 4 is an illustration of an enhanced autobrake interface with autobrake off in accordance with an illustrative embodiment.

Turning now to FIG. 4, an illustration of an enhanced autobrake interface with autobrake off is depicted in accordance with an illustrative embodiment. Interface 400 is similar to interface 300 depicted in FIG. 3. However, autobrake select menu 406 is different from autobrake select menu 306. Also, in this example, the pilot has selected autobrake off as indicated by selected autobrake indicator 304 and also by the selected option "off" 308 being displayed in a different manner from at least one of the non-selected option 310, 412.

Turning now to FIG. 5, an illustration of an enhanced autobrake interface in constant deceleration mode is depicted in accordance with an illustrative embodiment. In this example, the pilot has selected constant deceleration option 310 as indicated by the different appearance of constant deceleration option 310 as compared to other setting options 308, 412 and as shown in selected autobrake indicator 304 displaying "constant decel: 3" indicating that setting "3" of the "constant decel" setting has been selected. This causes the constant deceleration select menu 522 to be displayed. Constant deceleration select menu 522 includes options of "1" 524, "2" 526, "3" 528, "4" 530, and "MAX" 532. In the depicted example, "MAX" 532 is displayed in a manner, such as with amber coloring, to indicate that it is not recommended. The selected option, "3" 528 is displayed in a manner, such as with green coloring, to indicate that the pilot has made this selection.

Brake temperature display 302 shows the estimated brake temperatures for left landing gear 506, and right landing gear 508 as well as estimated cooling time 510. The brake temperatures in this example are displayed as 2.7 for left landing gear 506, and 5.2 for right landing gear 508. In the depicted example, the brake temperatures are shown in a scaled value where any value of 5 or greater is considered too hot. Thus, the right brake temperature is estimated to be 5.2 using the pilot's selections. This is displayed in a manner, for example, with amber coloring, to indicate that it is not recommended or is out of the recommended range.

In the depicted example, estimated cooling time for the brakes 510 is 52 minutes. This is the time for the brakes to cool to within the acceptable safe range for subsequent dispatch and lets the dispatcher and pilot know how long the aircraft must wait before the next departure. Various indicia may be used to differentiate available options, selected options, and unavailable options for various menus. The various indicia may include, for example, different colors, different shadings, use of different text formatting such as bold and italicized text, cross hatching, blinking indicators, etc. in order to differentiate between available options, selected options, and unavailable options.

In interface 500, info view 316 has been expanded to show a representation of runway 538 with diamond 540, 542, 544, 546, 548 representing the estimated landing distances for the various constant deceleration selections. Since, in this example, the pilot has selected option "3" 528, the diamond corresponding to setting "3" 544 is displayed in a manner, such as with green coloring, to indicate that this is the estimated landing distance for the pilot's selections. The representation of runway 538 can be shown in terms of landing distance by selecting landing distance option 550 or in BTMS by selecting BTMS option 552. In the depicted example, BTMS option 552 has been selected and may be indicated to the pilot by displaying it in, for example, a green color.

Turning now to FIG. 6, an illustration of an enhanced autobrake interface in runway exit selection mode is depicted in accordance with an illustrative embodiment. In this example, the pilot has selected runway exit selection option 412. Thus, runway exit selection menu 622 is displayed. Also, autobrake indicator 304 shows "RWY Exit E" indicating the pilot's selection. Runway exit menu 622 has options 626, 628, 630, 632, 634, 636, 640 for the various runway exits at the designated runway. Because there are more runway exits than can comfortably be displayed, scroll bar 624 is provided to allow the pilot to scroll between the various runway exit options. In an embodiment, exit options 626, 628, 630, 632, 636 are displayed in a manner as to distinguish them from exit options 634, 640 that are not available for selection by the pilot. For example, available options are displayed in white text and unavailable options are displayed in gray text. In the depicted example, exit E option 630 has been selected. The selected runway exit E option 630 is displayed in a manner to distinguish it from other runway exit options 626, 628, 632, 634, 636, 640. For example, the selected runway exit option may be displayed in green text.

In the depicted example, information view 316 has been collapsed. The estimated landing distance for the pilot's braking selection is provided in estimated landing distance display 314. In the depicted example, the estimated landing distance is 4,567 feet or 1,392 meters. In an embodiment, the estimated landing distance is provided in both feet and meters, but in other embodiments, the distance may only be provided in one system of measurement.

The predicted brake temperatures for the selected runway exit option are displayed in brake temperature display 302. In the depicted example, left landing gear 506 brake temperature is 2.7, and right landing gear 508 brake temperature is 3.2. Since all the temperatures are within the maximum brake temperature threshold, the temperatures for landing gear 506, 508 are displayed in, for example, white text. Estimated cooling time 510 for the brakes for the pilot's selection is shown as 18 minutes.

Figure 7:
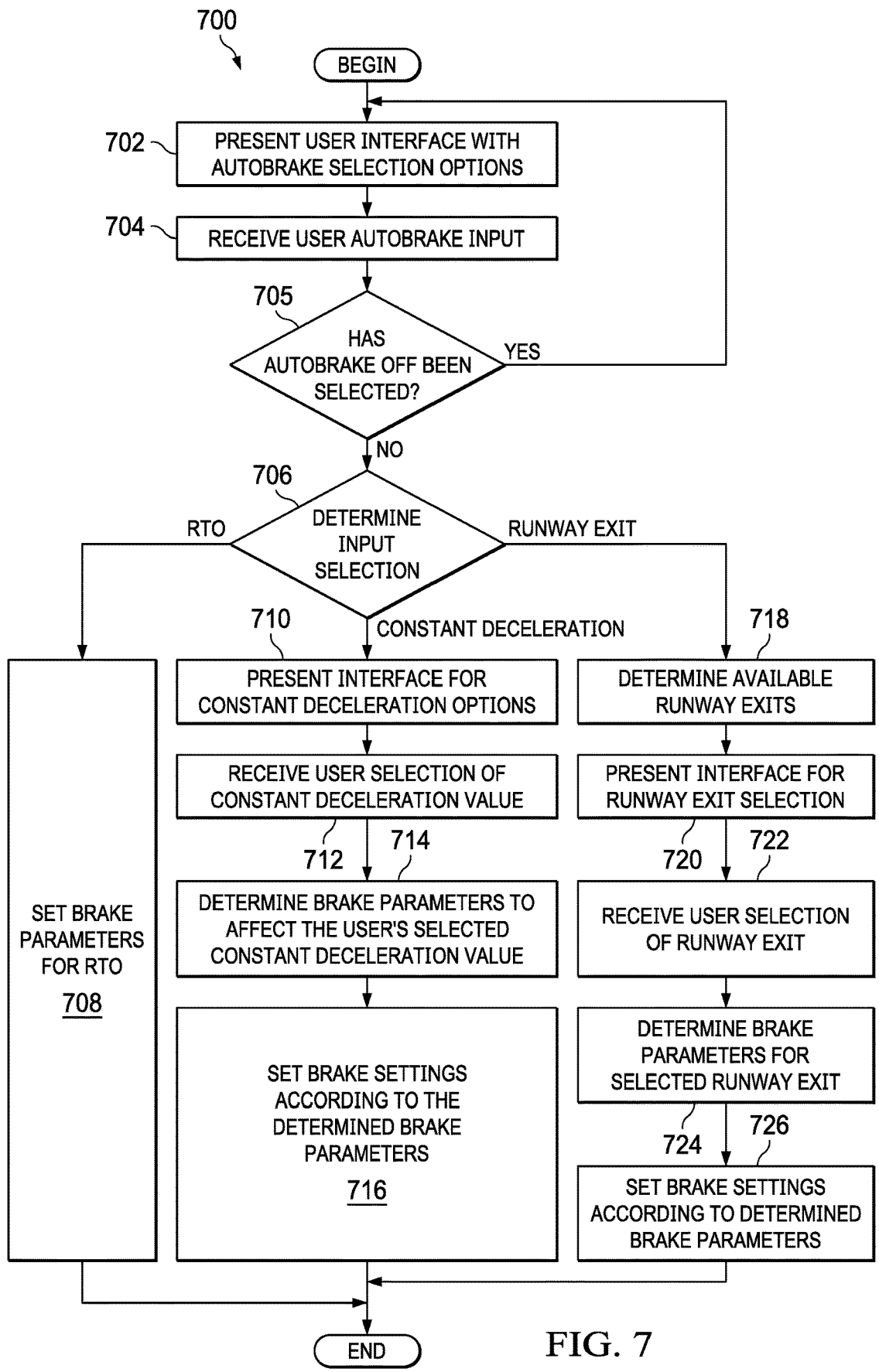
FIG. 7 is an illustration of an enhanced method for autobrake selection in accordance with an illustrative embodiment.

Turning now to FIG. 7, an illustration of an enhanced autobrake method for brake selection is depicted in accordance with an illustrative embodiment. Method 700 is an example of a method that may execute on system 200 and utilize interface 300, 400, 500, 600. Method 700 begins by presenting a user interface with autobrake selection options (step 702) to a user. In an embodiment, the options include off, RTO, constant deceleration, and runway exit selection. Next, user autobrake input is received (step 704). Next, method 700 determines if autobrake off has been selected (step 705). If autobrake off has been selected, then method 700 returns to step 702. If autobrake off has not been selected, then method 700 determines the input selection (step 706). If the user selects RTO, then method 700 sets the brake parameters for RTO (step 708), after which, method 700 ends.

If, at step 706, the selection type is constant deceleration, then method 700 presents the user with an interface for constant deceleration options (step 710). Method 700 then receives user selection of a constant deceleration value (step 712). Method 700 then determines the brake parameters to affect the user's selected constant deceleration value (step 714). Next, the brake settings are set according to the determined brake parameters (step 716), after which, method 700 ends.

If, at step 706, the input selection is determined to be the runway exit option, method 700 determines available runway exits (step 718). Next, method 700 presents an interface for runway exit selection (step 720). Runway exits that are not available due to, for example, the current speed of the aircraft and its location relative to the runway exit, are not selectable and displayed in a manner to so indicate. Next, method 700 receives user selection of a runway exit (step 722). Method 700 then determines the brake parameters that will effectuate slowing the aircraft to the appropriate speed to exit the runway at the runway exit selected by the user (step 724). Method 700 then sets the brake setting according to the determined brake parameters (step 726), after which, method 700 ends.

Figure 8:
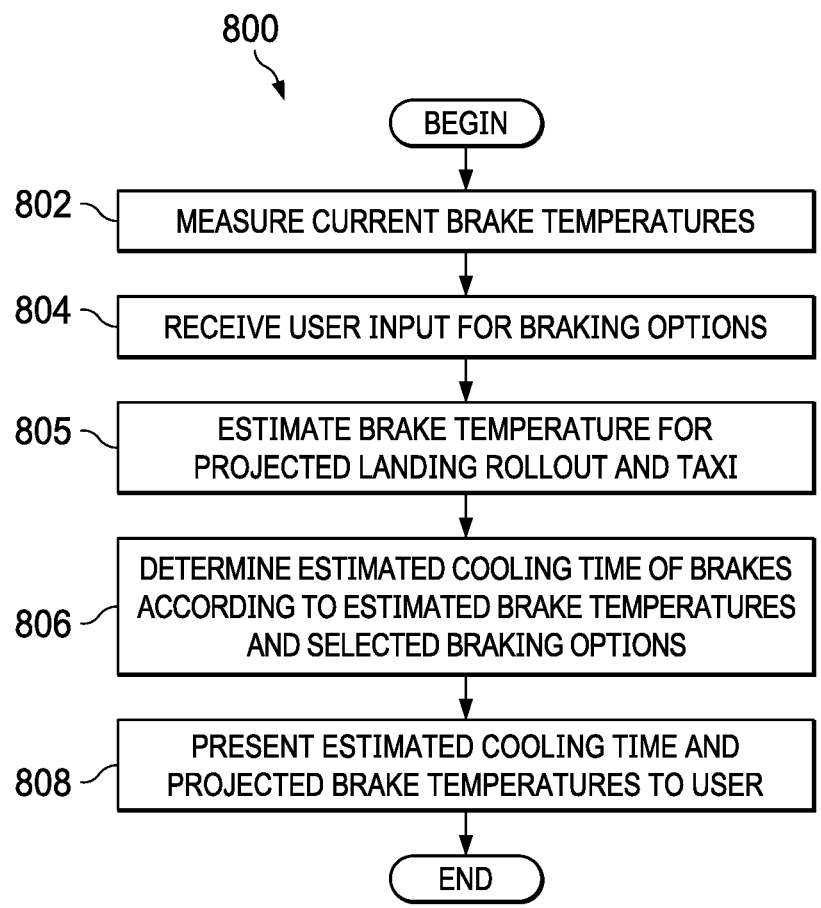
FIG. 8 is an illustration of an enhanced autobrake method for determining and displaying brake temperatures and estimated cooling time for brakes in accordance with an illustrative embodiment.

Turning now to FIG. 8, an illustration of an enhanced autobrake method for determining and displaying estimated brake temperatures and estimated cooling time for the brakes is depicted in accordance with an illustrative embodiment. Method 800 begins by measuring current brake temperatures (step 802). Next, method 800 receives user input for braking options (step 804). The braking options may be selected according to method 800 and autobrake system 200 using one of interface 300, 400, 500, 600. Method 800 then estimates the brake temperature for projected landing rollout and taxi (step 805). Next, method 800 determines estimated cooling time of brakes according to estimated brake temperatures and selected braking options (step 806). After determining the estimated cooling time, method 800 presents the estimated cooling time and projected brake temperatures to user (step 808) through, for example, one of interface 300, 400, 500, 600, after which, method 800 ends. The estimated cooling time of the brakes provides a minimum time for which the aircraft must wait before attempting to takeoff again. Therefore, if the estimated cooling time will be longer than the user desires, the user may adjust the braking selections to decrease the estimated cooling time and/or use other airplane deceleration devices, like thrust reversers.

Figure 9:
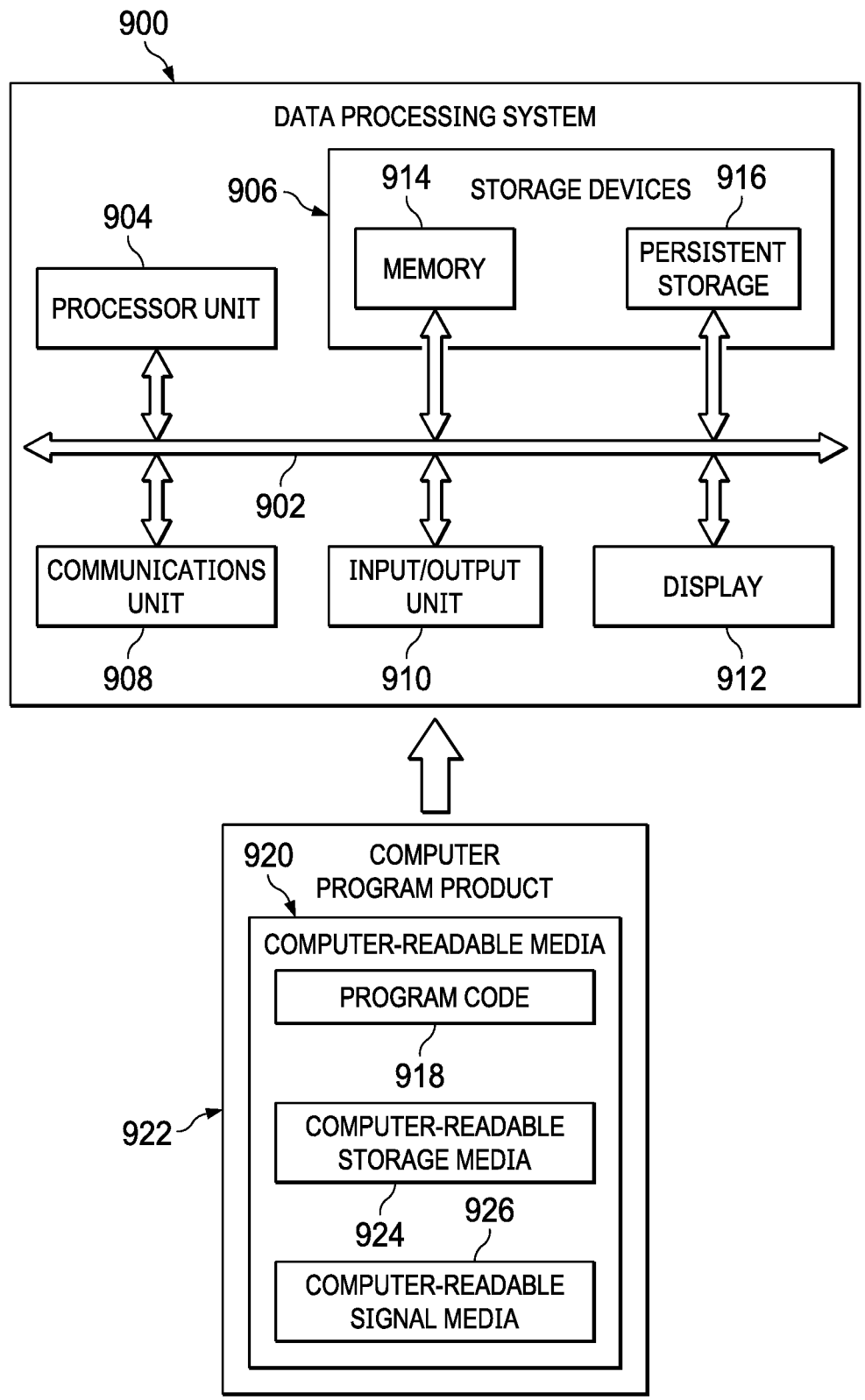
FIG. 9 is an illustration of a block diagram of a data processing system in accordance with an illustrative embodiment.

Turning now to FIG. 9, an illustration of a block diagram of a data processing system is depicted in accordance with an illustrative embodiment. Data processing system 900 may be used to implement portions of autobraking system 208 of FIG. 2, user selectable display 202 or brake parameters determiner 236. As depicted, data processing system 900 includes communications framework 902, which provides communications between processor unit 904, storage devices 906, communications unit 908, input/output unit 910, and display 912. In some cases, communications framework 902 may be implemented as a digital bus system.

Processor unit 904 is configured to execute instructions for software to perform a number of operations. Processor unit 904 may comprise a number of processors, a multi-processor core, and/or some other type of processor, depending on the implementation. In some cases, processor unit 904 may take the form of a hardware unit, such as a circuit system, an application specific integrated circuit (ASIC), a programmable logic device, or some other suitable type of hardware unit.

Instructions for the operating system, applications, and/or programs run by processor unit 904 may be located in storage devices 906. Storage devices 906 may be in communication with processor unit 904 through communications framework 902. As used herein, a storage device, also referred to as a computer-readable storage device, is any piece of hardware capable of storing information on a temporary and/or permanent basis. This information may include, but is not limited to, data, program code, and/or other information.

Memory 914 and persistent storage 916 are examples of storage devices 906. Memory 914 may take the form of, for example, a random access memory or some type of volatile or non-volatile storage device. Persistent storage 916 may comprise any number of components or devices. For example, persistent storage 916 may comprise a hard drive, a flash memory, a rewritable optical disk, a rewritable magnetic tape, or some combination of the above. The media used by persistent storage 916 may or may not be removable.

Communications unit 908 allows data processing system 900 to communicate with other data processing systems and/or devices. Communications unit 908 may provide communications using physical and/or wireless communications links.

Input/output unit 910 allows input to be received from and output to be sent to other devices connected to data processing system 900. For example, input/output unit 910 may allow user input to be received through a keyboard, a mouse, and/or some other type of input device. As another example, input/output unit 910 may allow output to be sent to a printer connected to data processing system 900.

Display 912 is configured to display information to a user. Display 912 may comprise, for example, without limitation, a monitor, a touch screen, a laser display, a holographic display, a virtual display device, and/or some other type of display device.

In this illustrative example, the processes of the different illustrative embodiments may be performed by processor unit 904 using computer-implemented instructions. These instructions may be referred to as program code, computer usable program code, or computer-readable program code and may be read and executed by one or more processors in processor unit 904.

In these examples, program code 918 is located in a functional form on computer-readable media 920, which is selectively removable, and may be loaded onto or transferred to data processing system 900 for execution by processor unit 904. Program code 918 and computer-readable media 920 together form computer program product 922. In this illustrative example, computer-readable media 920 may be computer-readable storage media 924 or computer-readable signal media 926.

Computer-readable storage media 924 is a physical or tangible storage device used to store program code 918, rather than a medium that propagates or transmits program code 918. Computer-readable storage media 924 may be, for example, without limitation, an optical or magnetic disk or a persistent storage device that is connected to data processing system 900.

Alternatively, program code 918 may be transferred to data processing system 900 using computer-readable signal media 926. Computer-readable signal media 926 may be, for example, a propagated data signal containing program code 918. This data signal may be an electromagnetic signal, an optical signal, and/or some other type of signal that can be transmitted over physical and/or wireless communications links.

Figure 10:
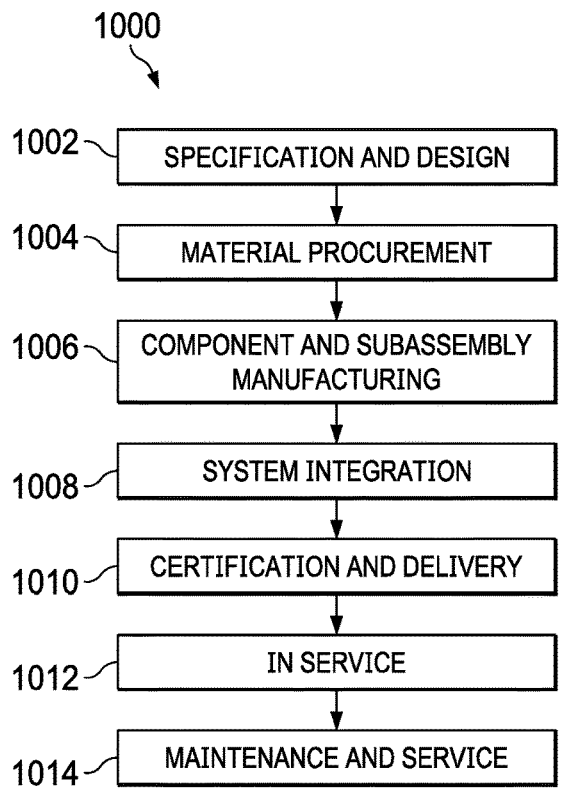
FIG. 10 is an illustration of an aircraft manufacturing and service method in the form of a block diagram in accordance with an illustrative embodiment.
Figure 11:
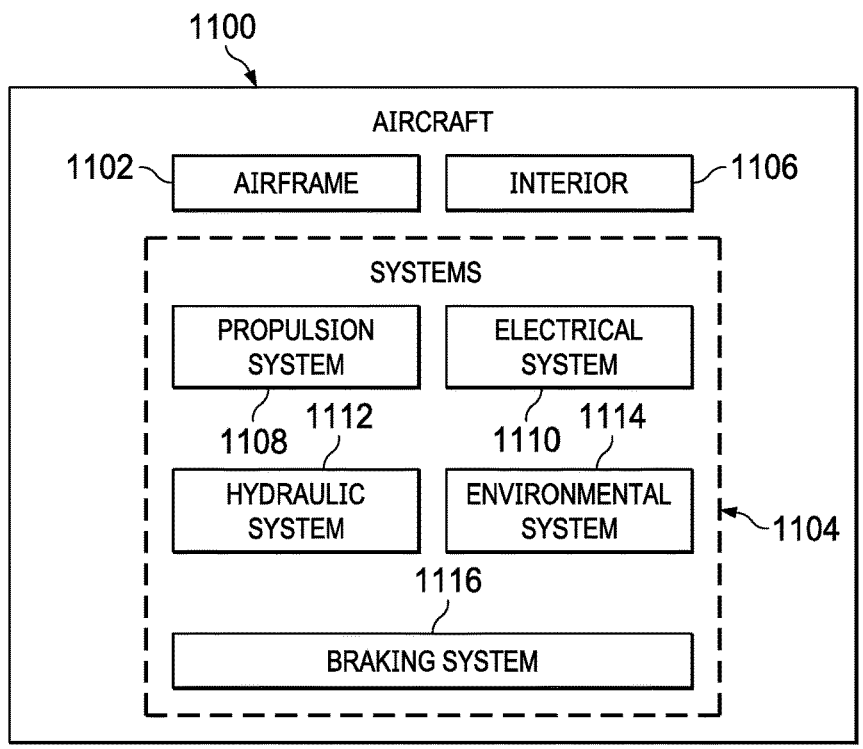
FIG. 11 is an illustration of an aircraft in the form of a block diagram in which an illustrative embodiment may be implemented.

Illustrative embodiments of the present disclosure may be described in the context of aircraft manufacturing and service method 1000 as shown in FIG. 10 and aircraft 1100 as shown in FIG. 11. Turning first to FIG. 10, an illustration of an aircraft manufacturing and service method is depicted in accordance with an illustrative embodiment. During pre-production, aircraft manufacturing and service method 1000 may include specification and design 1002 of aircraft 1100 in FIG. 11 and material procurement 1004.

During production, component and subassembly manufacturing 1006 and system integration 1008 of aircraft 1100 takes place. Thereafter, aircraft 1100 may go through certification and delivery 1010 in order to be placed in service 1012. While in service 1012 by a customer, aircraft 1100 is scheduled for routine maintenance and service 1014, which may include modification, reconfiguration, refurbishment, and other maintenance or service.

Each of the processes of aircraft manufacturing and service method 1000 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 11, an illustration of an aircraft is depicted in which an illustrative embodiment may be implemented. In this example, aircraft 1100 is produced by aircraft manufacturing and service method 1000 in FIG. 10 and may include airframe 1102 with plurality of systems 1104 and interior 1106. Examples of systems 1104 include one or more of propulsion system 1108, electrical system 1110, hydraulic system 1112, environmental system 1114, and braking system 1116. Any number of other systems may be included. Although an aerospace example is shown, different illustrative embodiments may be applied to other industries, such as the automotive industry.

Apparatuses and methods embodied herein may be employed during at least one of the stages of aircraft manufacturing and service method 1000. One or more illustrative embodiments may be used during component and subassembly manufacturing 1006 of FIG. 10. For example, the enhance autobrake interface 300, 400, 500, 600 and autobrake system 200 may be installed in the cockpit during the aircraft manufacturing and service method 1000.

In an embodiment, an autobrake selection interface for an aircraft is provided. The autobrake selection interface includes a cockpit mounted user selectable display. The display includes autobrake selection options and braking information. The autobrake selection options include at least one of an autobrake off option, a rejected takeoff (RTO) option, a constant deceleration option, and a runway exit selection option. The braking information includes at least one of an estimated brake temperature, an estimated brake cooling time, and an estimated landing distance. The autobrake selection interface also includes a braking parameters determiner configured to determine at least one of the estimated brake temperature and the estimated landing distance according to user selection of the autobrake selection options.

In an illustrative embodiment, the cockpit mounted user selectable display includes a touchscreen, wherein user selection of options presented on the touchscreen are made by touching an appropriate area on the touchscreen. In an illustrative embodiment, the constant deceleration option includes a selectable menu comprising a plurality of constant deceleration settings. In an illustrative embodiment, the runway exit selection option includes a selectable display of a plurality of runway exit numbers corresponding to runway exits at an airfield. In an illustrative embodiment, the selectable display of the plurality of runway exit numbers is presented to the user such that available runway exit numbers are presented in a first display format and unavailable runway exit numbers are presented in a second display format. In an illustrative embodiment, the available runway exit numbers are determined according to at least one of aircraft location on a runway and aircraft speed.

In an illustrative embodiment, the estimated brake temperature is displayed in a first brake temperature display format when the estimated brake temperature is below a threshold and wherein the estimated brake temperature is displayed in a second brake temperature display format when the estimated brake temperature is at or above the threshold. In an illustrative embodiment, the estimated brake cooling time is displayed in a first estimated brake cooling format when the estimated brake cooling time is below a cooling threshold time and wherein the estimated brake cooling time is displayed in a second estimated brake cooling format when the estimated brake cooling time is at or above a cooling threshold time.

In an embodiment, a method for autobrake selection in an aircraft is provided. The method includes displaying an autobrake selection interface comprising a constant deceleration option and a runway exit option. The method also includes displaying one of a constant deceleration selection menu and a runway exit menu response to user input in the autobrake selection interface. The method also includes setting a brake parameter according to user selection of one of a constant deceleration setting and a runway exit number.

In an illustrative embodiment, the method also includes determining an estimated brake temperature for the brakes according to the user selection of one of the constant deceleration setting and the runway exit number. In an illustrative embodiment, the runway exit menu comprises a plurality of options with each option corresponding to a respective runway exit at a destination airport. In an illustrative embodiment, the method also includes determining the brake parameter according to a runway exit number selected by the user. In an illustrative embodiment, the method also includes determining an estimated cooling time for a brake according to the user selection of one of the constant deceleration setting or the runway exit number. In an illustrative embodiment, the method also includes displaying the estimated brake temperature.

In an illustrative embodiment, the method also includes displaying the estimated brake temperature in a first format if the estimated brake temperature is less than a threshold and displaying the estimated brake temperature in a second format if the estimated brake temperature is greater than the threshold. In an illustrative embodiment, the first format includes a first indicia and the second format comprises a second indicia. In an illustrative embodiment, options corresponding to exit numbers that are unavailable due to at least one of the aircraft location on the runway and a current aircraft speed are unselectable by the user. In an illustrative embodiment, the unselectable options are displayed in a different format from the selectable options to indicate to a user which options are selectable.

In an embodiment, a computer for autobrake selection in an aircraft is provided. The computer includes a processor and a non-transitory computer readable storage medium storing program code which, when executed by the processor, performs a computer-implemented method of autobrake selection in an aircraft. The program code includes program code for displaying an autobrake selection interface comprising a constant deceleration option and a runway exit option. The program code also includes program code for displaying one of a constant deceleration selection menu and a runway exit menu response to user input in the autobrake selection interface. The program code also includes program code for setting a brake parameter according to user selection of one of a constant deceleration setting and a runway exit number.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An autobrake selection interface, configured to set a brake setting for an aircraft, such that the autobrake selection interface comprises:
    a user selectable display, in a cockpit of the aircraft, that comprises:
        autobrake selection options displayed and selectable on the user selectable display that comprise at least one of the following: an autobrake off option, a rejected takeoff (RTO) option, a constant deceleration option, and a runway exit selection option; and
        braking information that comprises the following:
            an estimated brake temperature;
            an estimated brake cooling time;
            responsive to a selection of the constant deceleration option:
                a constant deceleration select menu that comprises a number of options; and
                an expandable info view that comprises a brake temperature monitoring system score displayed in a scaled format, respectively and simultaneously, for each of the number of options on the constant deceleration select menu regardless of which option is selected; and
    a processor that comprises a braking parameters determiner configured to determine the following: the estimated brake temperature, the brake temperature monitoring system score, and an estimated landing distance.

2. The autobrake selection interface of claim 1, wherein:
    the user selectable display comprises a touchscreen configured to receive selections based upon a touch on an appropriate area on the touchscreen; and
    braking information further comprises:
        a runway exit select menu that comprises a number of runway exit options; and the estimated landing distance displayed on the expandable info view, respectively and simultaneously, for each of the number of runway exit options on the runway exit select menu select menu.

3. The autobrake selection interface of claim 1, wherein a max constant deceleration option comprises a brake temperature monitoring system score of 9.9 or less.

4. The autobrake selection interface of claim 1, further comprising a number of runway exit options that corresponds to taxiway runway exits for a runway displayed on the autobrake selection interface.

5. The autobrake selection interface of claim 4, wherein the autobrake selection interface is configured to display available runway exit numbers in a first display format and unavailable runway exit numbers in a second display format.

6. The autobrake selection interface of claim 5, the autobrake selection interface is further configured to display on the autobrakes selection interface, an available runway exit numbers based upon at least one of the following: aircraft location on a runway, and aircraft speed.

7. The autobrake selection interface of claim 1, wherein the autobrake selection interface is further configured to display the estimated brake temperature in a first brake temperature display format when the estimated brake temperature is below a threshold, and in a second brake temperature display format when the estimated brake temperature is at or above the threshold.

8. The autobrake selection interface of claim 1, wherein the autobrake selection interface is further configured to display the estimated brake cooling time is displayed in a first estimated brake cooling format when the estimated brake cooling time is below a cooling threshold time, and in a second estimated brake cooling format when the estimated brake cooling time is at or above a cooling threshold time.

9. A method for setting an autobrake selection in an aircraft for activating an autobrake system on the aircraft, the method comprising:
   displaying an autobrake selection interface comprising a constant deceleration option and a runway exit option;
   receiving on the autobrake selection interface, a selection of the constant deceleration option or the runway exit option;
   displaying, responsive to the autobrake selection interface receiving the selection of the constant deceleration option:
      a constant deceleration select menu comprising a number of options; and
      an expandable info view comprising a brake temperature monitoring system score displayed in a scaled format, respectively and simultaneously, for each of the number of options on the constant deceleration select menu regardless of which option is selected;
   displaying, responsive to the autobrake selection interface receiving the selection of the runway exit option, a runway exit menu; and
   setting, according to a selection from one of the constant deceleration select menu or the runway exit menu, a brake setting controlling the autobrake system on the aircraft.

10. The method of claim 9, further comprising:
    determining, using a brake parameters determiner in a processor for the autobrake system on the aircraft and a selection of one of the constant deceleration setting and a runway exit number, an estimated brake temperature for brakes on the aircraft.

11. The method of claim 10, further comprising displaying, responsive to the autobrake selection interface receiving a selection of the runway exit option, the runway exit menu comprising a number of options, with each option corresponding to a respective runway exit at a destination airport.

12. The method of claim 9, further comprising:
    determining, using a brake parameters determiner in a processor for the autobrake system on the aircraft and a runway exit selection received by the autobrake selection interface, a brake parameter.

13. The method of claim 9, further comprising:
    determining, using a brake parameters determiner and a selection of the constant deceleration option or the runway exit option, an estimated cooling time for a brake.

14. The method of claim 10, further comprising:
    displaying an estimated landing distance.

15. The method of claim 10, further comprising:
    displaying the estimated brake temperature in a first format if the estimated brake temperature is less than a threshold; and
    displaying the estimated brake temperature in a second format if the estimated brake temperature is greater than the threshold.

16. The method of claim 15, wherein the first format comprises a first indicia and the second format comprises a second indicia.

17. The method of claim 16, wherein options corresponding to exit numbers that are unavailable due to at least one of an aircraft location on a runway and a current aircraft speed are displayed but not selectable.

18. The method of claim 17, wherein options that are not selectable are displayed in a different format from selectable options.

19. A computer configured to receive and apply an autobrake selection in an aircraft that comprises:
    a processor of an autobrake system on the aircraft; and
    a non-transitory computer readable storage medium storing program code configured to, when executed by the processor, perform a computer implemented method of autobrake selection in the aircraft, such that the program code comprises:
       program code configured to display an autobrake selection interface that comprises a constant deceleration option and a runway exit option;
       program code configured to display:
          responsive to a selection received by the autobrake selection interface of the constant deceleration option:
             a constant deceleration select menu that comprises a number of options; and
             an expandable info view that comprises a brake temperature monitoring system score displayed in a scaled format, respectively and simultaneously, for each of the number of options on the constant deceleration select menu regardless of which option is selected; and
          responsive to a selection received by the autobrake selection interface of the runway exit option, a runway exit menu; and
       program code configured to set, based upon the selection received by the autobrake selection interface of one of the constant deceleration menu or the runway exit menu, a brake setting controlling the autobrake system on the aircraft.

20. The computer of claim 19, further comprising:
    program code configured to determine an estimated brake temperature for a brake according to a selection received by the autobrake selection interface from of one of the constant deceleration selection menu and a runway exit number; and program code configured to determine the brake parameter according to a runway exit menu.

* * * * *